July 13, 1943.    S. H. BROOKS    2,324,061
HINGED JOINT
Filed Sept. 11, 1942
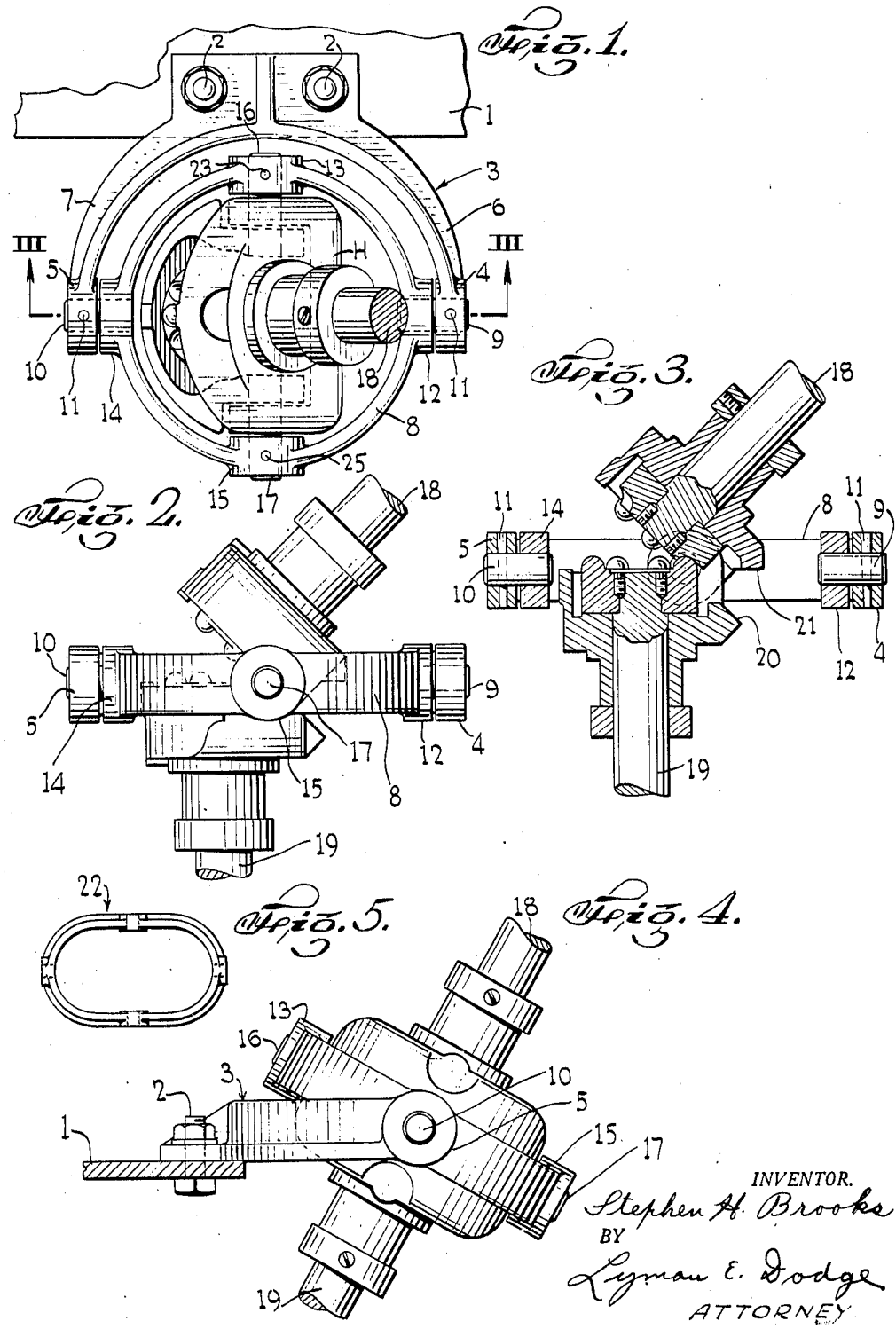
INVENTOR.
Stephen H. Brooks
BY
Lyman E. Dodge
ATTORNEY Patented July 13, 1943

2,324,061

UNITED STATES PATENT OFFICE 2,324,061

HINGED JOINT

Stephen H. Brooks, New York, N. Y.

Application September 11, 1942, Serial No. 457,915

3 Claims. (Cl. 74—380)

This invention relates to hinged joints, particularly hinged joints for shafting and more especially a support for such a joint.

A principal object of this invention is the production of supporting means for a shafting hinged joint which will allow the two shafts connected by the hinged joint to oscillate freely about a pivot positioned in a plane passing through the longitudinal axes of both shafts.

Further objects and advantages will appear as the description of the invention and the particular physical embodiments selected to illustrate the invention progresses, and the novel features will be particularly pointed out in the appended claims.

In describing the invention in detail, and the particular physical embodiments selected to illustrate the invention, reference will be had to the accompanying drawing and the several views thereon, in which like characters of reference designate like parts throughout the several views, and in which:

Figure 1 is a top plan view of a device embodying my invention illustrating a form of hinged joint and a support therefor; Fig. 2 is a front elevational view of the device as shown by Fig. 1; Fig. 3 is a cross sectional view of the device as shown by Fig. 1, on the plane indicated by the line III—III of Fig. 1, viewed in the direction of the arrows at the ends of the line; Fig. 4 is a side elevational view of the device as shown in Fig. 1 viewed from the left hand side thereof as shown in Fig. 1 but with the shafts positioned substantially in line; Fig. 5 is a top plan view of a modified form of gimbal ring as used in my invention.

A well known form of hinged joint, universal joint or, sometimes called, flexible joint is shown in my prior Patent No. 2,281,913, granted May 5, 1942 and for the purposes of this disclosure the hinged joint shown in the drawing may be considered as of the form as shown in the said patent.

The form of joint as shown in the said patent has been usually supported by rigid brackets embracing a portion of the casing of the joint. This form of support is likely to give rise to strains in both the joint itself and the shafts connected by the joint. This is so because even if all parts are carefully aligned and positioned when installed due to changes in relative positions of the surrounding, presumably fixed, objects to which the rigid brackets are attached, the parts are likely and generally do get somewhat out of alignment or position as originally placed.

In the form of support shown by the present drawing the joint is so related to an adjacent fixed object that it may shift its position, in certain respects, so as to adjust itself to a new alignment whereby stresses, which might otherwise appear, are obviated.

In the drawing numeral 1 designates a fixed object. By any suitable or usual means, such as bolts 2, separated arms 6 and 7 with or without a common connection, forming a bracket 3, may be secured.

The bracket 3 may be of any appropriate form and structural design provided with orifices for the reception of the bolts 2 just so long as it affords two separated trunnion bearings as 4 and 5 and sufficient space between the portions or arms as 6 and 7, supporting the trunnion bearings, affording an appropriate free space for the oscillation of a gimbal ring, as 8.

In each of the trunnion bearings, as 4 and 5, there is positioned a pivot means, shown in the drawing as a pivot pin, or trunnion, as 9 and 10, which may be secured in the trunnion bearing in any suitable or appropriate manner as by through pins such as 11.

There is provided a gimbal member 8, preferably in the form of a ring. The gimbal ring 8 is provided with four bearings at the extremities of two diameters, preferably at a right angle each to the other, as 12, 13, 14 and 15.

Bearings 12 and 14 receive the trunnions 9 and 10 respectively so that the gimbal ring 8 may oscillate on the trunnions 9 and 10 in a plane at a right angle to the longitudinal axis passing through the trunnions 9 and 10.

The pivot pins, or trunnions, 9 and 10 may, of course, be, as shown, rigid with 3, but it is understood that it is not intended to exclude a construction in which the pivot pins 9 and 10, instead, are pinned to gimbal ring 8.

The gimbal ring 8 in the bearings 13 and 15 receive the hinge pins 16 and 17 of the hinged joint designated as a whole by H and made in accordance with the disclosure of my said Patent No. 2,281,913. These hinge pins 16 and 17 correspond to hinge pins such as 31 and 32 of the said patent.

It is to be understood that although pins 16 and 17 are shown as pinned by pins 23 and 25 to gimbal ring 8, nevertheless, it is not intended to exclude a construction in which the pins 16 and 17 are, instead, pinned to the casings of the joint.

As the shafts 18 and 19 may oscillate about the pins, as 16 and 17, in a plane through the longitudinal axis of the trunnions 9 and 10 through an arc of about 90°, that is, from the position as shown in Fig. 4 to a position in which the shaft, as 18, as shown in Fig. 3, reaches the gimbal ring 8 or the abutments 20 and 21 come together, there is a very considerable latitude in the positioning of the shafts 18 and 19 and as later movements of the shafts about the pivots 16 and 17 in this plane brings no stress upon the pins, the joint is a free one in this respect.

The shafts 18 and 19 may not only move in the plane through the longitudinal axes of trunnions 9 and 10 but, even when preliminarily aligned or after initial installation, forces may be brought into play which will tend to move the plane in which the longitudinal axes of shafts 18 and 19 are positioned in such wise that they tend, as a whole, to pivot about pivot pins 9 and 10. If such tendency occurs, or if during the initial installation it is desired to position the shafts so that the gimbal ring 8 is not in the plane of the bracket 3, the gimbal ring 8 may be allowed to oscillate in a plane at a right angle to the plane through the axes of trunnions 9 and 10 and so allow the shafts to be initially installed without strain therein or to move to a new position, decreasing any stress which might otherwise be occasioned due to their freedom of movement about the pivot pins 9 and 10.

In Fig. 5 there is shown a gimbal ring comparable to the gimbal ring 8. This gimbal ring has been designated 22. It merely serves to illustrate that the gimbal ring 8 may take various forms. In Fig. 1 it is shown as substantially a circle. It may be formed so that its general contour will be various other shapes such as substantially an oval as shown in Fig. 5. By so changing the shape of the gimbal ring 8 it may the better be made to accommodate greater or less possible movements of the shafts 18 and 19 without interference therewith.

Although one particular physical embodiment of my invention and one modification only thereof has been described, nevertheless, it is desired to have it understood that the forms selected are merely illustrative and do not exhaust the possible physical embodiments of the idea and means underlying my invention.

What is new and desired to secure by Letters Patent of the United States, is:

1. A hinged shaft joint support, having in combination; a member adapted to be attached to a fixed object provided with separate trunnion bearings in alignment; trunnions positioned in the bearings; a gimbal ring provided with four bearings arranged in pairs at the extremities of two diameters of the ring, one pair cooperating with the said trunnions to allow the gimbal ring to oscillate in a plane at a right angle to the plane passing through the longitudinal axes of the trunnions, the other pair adapted to cooperate with the hinge pins of a hinge joint to allow the joint parts to oscillate about the longitudinal axis through the said other pair.

2. As a support for the type of hinged shaft joint which includes separated hinge pins in alignment, in combination; a member provided with separated orifices in alignment each adapted for the reception of a hinge pin of a hinge pin shaft joint whereby relative oscillation may take place between the member and the joint; two separated trunnions in alignment; two arms; means for attaching said arms to a fixed object, said arms and said member being provided with cooperating parts for receiving said trunnions whereby the said member may oscillate about the longitudinal axis of said trunnions.

3. As a support for a hinged joint of the type in which there is a first shaft; a second shaft; each shaft provided with a gear intermeshing with the gear on the other shaft; a casing for the first shaft, a casing for the second shaft; and common pins upon which the said casings may relatively oscillate; the combination of a ring provided at diametrically opposite points with bearings for the reception of the pins, said ring further provided with means for oscillating about an axis at substantially a right angle to the axis about which the casings oscillate, and fixed members supporting said means whereby the shafts may oscillate freely in two planes one at a right angle to the other.

STEPHEN H. BROOKS.